United States Patent
Bouillon et al.

(10) Patent No.: US 8,579,995 B2
(45) Date of Patent: Nov. 12, 2013

(54) METHOD FOR FORMING A THIN-FILM LITHIUM-ION BATTERY

(75) Inventors: Pierre Bouillon, Luynes (FR); Delphine Guy-Bouyssou, Luynes (FR)

(73) Assignee: STMicroelectronics (Tours) SAS, Tours (FR)

( * ) Notice: Subject to any disclaimer, the term of this patent is extended or adjusted under 35 U.S.C. 154(b) by 230 days.

(21) Appl. No.: 12/939,502

(22) Filed: Nov. 4, 2010

(65) Prior Publication Data

US 2011/0111281 A1 May 12, 2011

(30) Foreign Application Priority Data

Nov. 6, 2009 (FR) ...................................... 09/57867

(51) Int. Cl.
*H01M 6/46* (2006.01)
*H01M 4/82* (2006.01)
*H01M 6/00* (2006.01)
*B23K 26/00* (2006.01)

(52) U.S. Cl.
USPC ..... 29/623.1; 429/152; 29/623.5; 219/121.72

(58) Field of Classification Search
USPC ........... 29/623.1–623.5; 429/152; 219/121.72
See application file for complete search history.

(56) References Cited

U.S. PATENT DOCUMENTS

| 5,171,413 A | 12/1992 | Arntz et al. |
| 6,355,376 B1 | 3/2002 | Meunier |
| 2005/0001214 A1* | 1/2005 | Brun et al. ....................... 257/59 |
| 2008/0224991 A1* | 9/2008 | Chiou et al. ................... 345/107 |
| 2008/0311477 A1* | 12/2008 | Salot et al. ............... 429/231.95 |

OTHER PUBLICATIONS

French Search Report dated Mar. 30, 2010 from corresponding French Application No. 09/57867.

* cited by examiner

*Primary Examiner* — Karie O'Neill Apicella
(74) *Attorney, Agent, or Firm* — Wolf, Greenfield & Sacks, P.C.

(57) ABSTRACT

A method for forming an integrated lithium-ion type battery, including the successive steps of: forming, on a substrate, a stack of a cathode layer made of a material capable of receiving lithium ions, an electrolyte layer, and an anode layer of the battery; forming a short-circuit between the anode and cathode layers; performing a thermal evaporation of lithium; and opening the short-circuit between the anode and cathode layers.

10 Claims, 3 Drawing Sheets

US 8,579,995 B2

METHOD FOR FORMING A THIN-FILM LITHIUM-ION BATTERY

CROSS REFERENCE TO RELATED APPLICATIONS

This application claims the priority benefit of French patent application number 09/57867, filed on Nov. 6, 2009, entitled "METHOD FOR FORMING A THIN-FILM LITHIUM-ION BATTERY," which is hereby incorporated by reference to the maximum extent allowable by law.

BACKGROUND OF THE INVENTION

1. Field of the Invention

The present invention relates to a method for forming a thin-film lithium-ion battery. More specifically, the present invention relates to a method for forming such batteries.

2. Discussion of the Related Art

Lithium-ion type batteries are formed of a stack of a cathode layer, an electrolyte layer, and an anode layer. During the battery charge, lithium ions travel from the cathode to the anode while, during the battery discharge, the lithium ions travel from the anode to the cathode.

The materials of the cathode, electrolyte, and anode layers are selected according to the voltage which is desired to be obtained across the battery and according to the desired application thereof. Especially, for data backup/retention applications in portable devices such as telephones or computers, the batteries are generally provided to supply a voltage smaller than 2 V. To obtain this voltage, a battery supplying a voltage ranging between 4 and 4.5 V, in association with a voltage step-down circuit may be used. Such a battery, for example, comprises a cobalt lithium oxide cathode ($LiCoO_2$). A battery providing a voltage smaller than 3 V, for example comprising a cathode based on titanium oxysulfide (TiOS), may also be used. This last type of battery is considered herein.

FIG. 1 illustrates an example of a lithium-ion type battery formed in thin layers.

The battery is formed on a substrate 10 covered with a thin insulating layer 12, for example, made of silicon oxide, of silicon nitride, or of a stack of these materials. At the surface of insulating layer 12 is formed a cathode collector layer 14, for example, made of titanium. Layer 14 comprises a first portion, in a region A, at the surface of which the active stack of the battery is formed. Layer 14 comprises a second portion intended to receive an electric contact on its surface.

At the surface of layer 14, in active layer A, is formed a cathode layer 16.

As an example, layer 16 may be made of TiOS, a material capable of inserting lithium ions. At the surface of layer 16 is formed an electrolyte layer 18, for example, lithium phosphorus oxynitride (LiPON). In the shown example, layer 18 extends on one side of layer 16 to contact insulating layer 12. Layer 18 also extends on layer 14 on the contour of layer 16.

At the surface of electrolyte layer 18 is formed an anode layer 20, for example, made of silicon or germanium. Such amorphous materials have the specificity of becoming conductive under the influence of the lithium crossing them during the battery operation, the lithium transiently alloying with silicon or germanium.

At the surface of anode layer 20 is formed an anode collector layer 22, for example, made of titanium. Layer 22 extends, in the shown example, on layer 20 and on the extension of electrolyte layer 18 to reach the surface of insulating layer 12. The extension of layer 22 on insulating layer 12 enables forming anode contact. It should be noted that, in addition to their electric functions, titanium layers 14 and 20 also form barrier layers against the diffusion of lithium.

In the shown example, contact pads 24 and 26 are formed on the extensions of layers 14 and 22 formed at the surface of insulating layer 12. Generally, contact elements such as wires or solder bumps are then formed on contact pads 24 and 26, or directly on the extensions of layers 14 and 22. A passivation layer is then formed over the entire device. It should be noted that contact pad 26 may also be formed at the surface of the stack of layers 16, 18, 20, and 22 if the extension of layer 22 is not provided.

A structure such as that in FIG. 1, with layer 16 made of TiOS, associated with lithium ions, is generally formed as follows. Cathode collector layer 14 is formed at the surface of insulating layer 12 by means of an adapted mask or by etching of a full plate layer. Then, a TiOS layer is formed at the surface of the cathode collector layer. This layer is transformed into an LiTiOS layer to become cathode layer 16 by direct thermal metal evaporation of lithium. Then, by means of an adapted mask or by etching, layers 18, 20, and 22 are formed at the surface of cathode layer 16.

The insertion of lithium by the above method does not enable to form a cathode layer 16 of good quality. This lack of quality is considered as resulting from the fact that, during this step and during the next heating steps, for example to form solder bumps, sulfur compounds of lithium such as $Li_2S$, $Li_2SO_3$, or $Li_2SO_4$ form at the surface and across the volume of the TiOS layer. Such compounds decrease the quality of the cathode layer, and thus the battery performance.

There thus is a need for a method for forming a thin-film lithium-ion type battery comprising an LiTiOS cathode layer of improved quality.

SUMMARY OF THE INVENTION

An object of an embodiment of the present invention is to provide a method for forming a thin film lithium-ion type battery overcoming the disadvantages of known methods.

Thus, an embodiment of the present invention provides a method for forming an integrated lithium-ion type battery, comprising the successive steps of: forming, on a substrate, a stack of a cathode layer made of a material capable of receiving lithium ions, an electrolyte layer, and an anode layer of the battery; forming a short-circuit between the anode and cathode layers; performing a thermal evaporation of lithium; and opening the short-circuit between the anode and cathode layers.

According to an embodiment of the present invention, the method comprises a previous step of forming a cathode collector layer on the substrate, under the stack, the cathode collector layer comprising an extension forming a first pad intended to receive a cathode connection and a second separate pad intended to receive an anode connection, the short-circuit between the anode and cathode layer being formed by a conductive strip extending between the first and second pads, the anode layer extending all the way to the second pad.

According to an embodiment of the present invention, the step of opening of the short-circuit is performed by cutting the strip by means of a laser or by performing a photolithography.

According to an embodiment of the present invention, the method further comprises, after the evaporation step, a step of forming of an anode collector layer and a step of forming of a passivation layer on the structure.

According to an embodiment of the present invention, the cathode layer is made of titanium oxysulfide (TiOS) and the anode layer is made of silicon or germanium.

According to an embodiment of the present invention, the electrolyte layer is made of lithium phosphorus oxynitride (LiPON).

According to an embodiment of the present invention, the cathode collector layer, the conductive strip, and the pads are made of the same material.

According to an embodiment of the present invention, the substrate is covered with an insulating layer.

An embodiment of the present invention further provides a lithium-ion type battery, comprising: at the surface of a substrate, a cathode collector layer comprising an extension forming a first pad and a second pad, a conductive strip being formed between the first and second pads; a stack of a cathode layer, an electrolyte layer, and an anode layer at the surface of the cathode collector layer, the anode layer contacting the second pad; and an anode collector layer extending on the anode layer and contacting the second pad, the strip being interrupted.

The foregoing objects, features, and advantages of the present invention will be discussed in detail in the following non-limiting description of specific embodiments in connection with the accompanying drawings.

DETAILED DESCRIPTION

To overcome the disadvantages of known methods, the present inventors provide a method for forming a thin-film lithium-ion type battery in which the insertion of lithium ions in the cathode layer is performed once the electrolyte and anode layers have been formed. During this step, the battery is short-circuited.

FIGS. 2A to 2E are three-dimensional views illustrating results of steps of a method for manufacturing a lithium-ion battery. In these drawings, a single elementary cell forming a lithium-ion type battery is shown. Conventionally, many elementary batteries are formed simultaneously at the surface of the same substrate.

Figure 1:
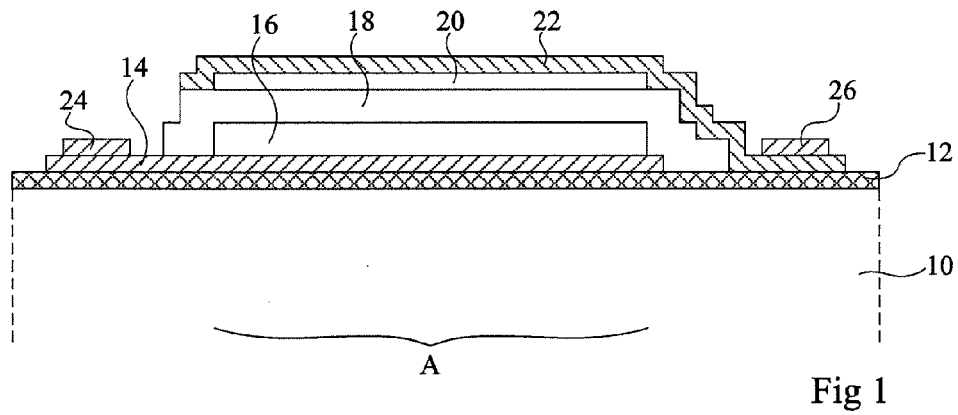
FIG. 1, previously described, illustrates a conventional lithium-ion type battery.
Figure 2A:
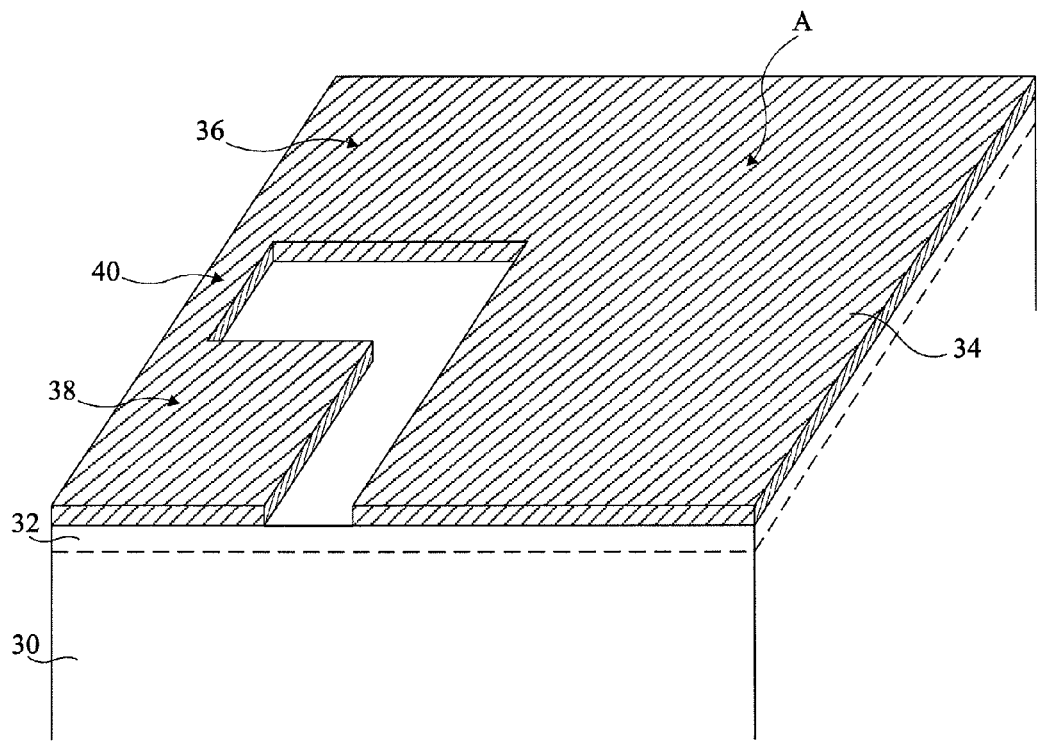
FIGS. 2A to 2E are three-dimensional views illustrating steps of an example of a method according to an embodiment of the present invention.

At the step illustrated in FIG. 2A, it is started from a structure comprising a substrate 30, for example, a silicon wafer at the surface of which an insulating layer 32 (delimited by dotted lines in FIG. 2A and in the next drawings) is formed. At the surface of insulating layer 32 is formed a layer 34 of an electrically conductive material forming a barrier against the diffusion of lithium, for example, made of titanium.

Layer 34 comprises different portions. A first portion of this layer is formed at the level of a region A intended to receive the active stack of the battery. Layer 34 is continued to form a pad 36 intended to receive a cathode connection. A separate portion of layer 34 forms a pad 38 intended to receive an anode connection. A conductive strip 40 is formed between pads 36 and 38. Strip 40 may be formed of the same material as layer 34 or of a conductive material different from that of layer 34.

As an example, layer 34 and pads 36 and 38 and strip 40 may be formed by full plate deposition of a titanium layer, followed by the etching of this layer through a mask. It may also be formed by direct deposition through a mask.

Figure 2B:
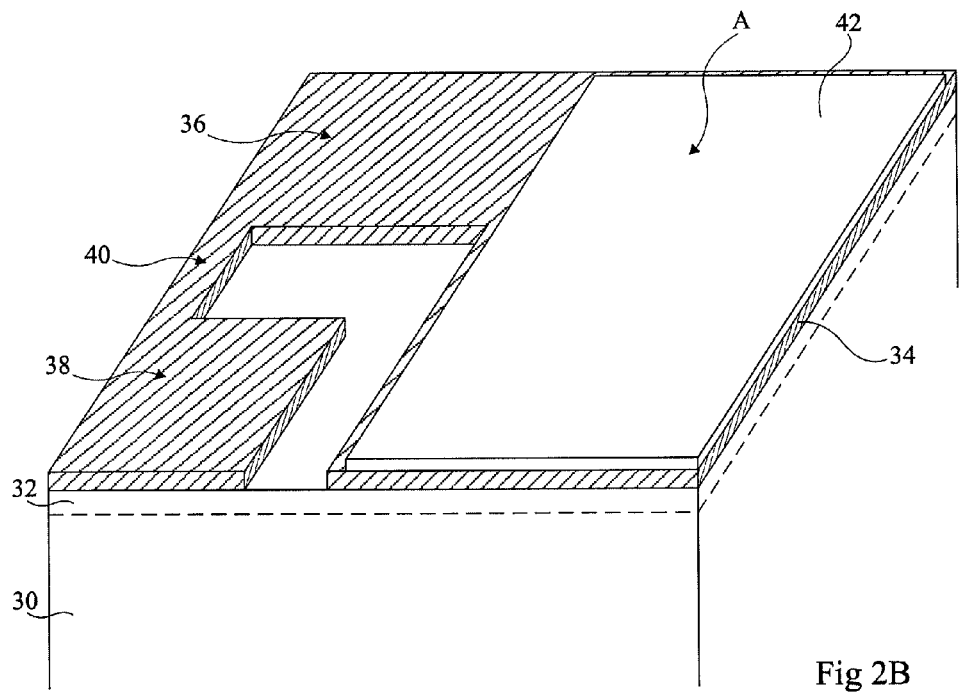

At the step illustrated in FIG. 2B, a titanium oxysulfide (TiOS) layer 42 has been formed on layer 34, at the level of active area A. Layer 42 does not extend above pads 36 and 38 and preferably extends on a surface of active layer A lower than the surface of layer 34. This enables avoiding any problem of alignment and short-circuit between the different stack layers. Layer 42 forms an initial layer for the forming of the battery cathode. As an example, layer 42 may have a thickness ranging between 1 and 5 μm.

Figure 2C:
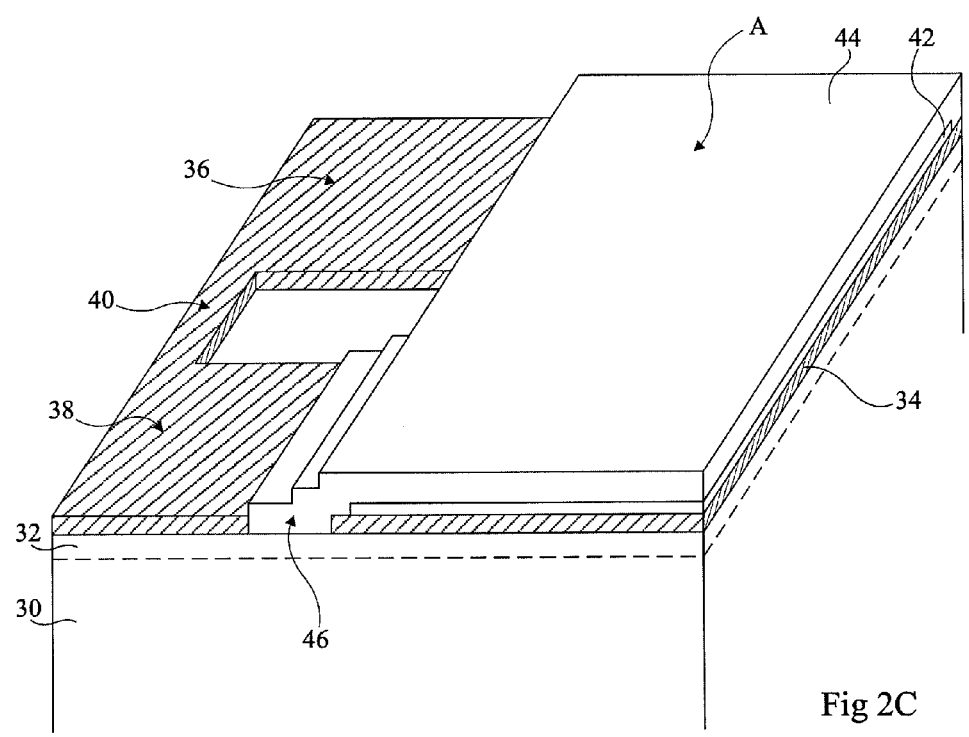

At the step illustrated in FIG. 2C, an electrolyte layer 44, for example, lithium phosphorus oxynitride (LiPON), has been formed at the surface of layer 42. Layer 44 comprises an extension 46 which comes into contact with insulating layer 32 and pad 38, between layer 34 and pad 38. Layer 44 may also slightly extend on pad 38. Further, preferably, it extends slightly beyond layer 42 in active layer A to contact layer 34. As known, LiPON is an electric insulator. Thus, layer 42 is insulated from the layers subsequently formed on the stack. As an example, layers 42 and 44 may be formed by means of an adapted mask and layer 44 may have a thickness ranging between 1 and 3 μm.

Figure 2D:
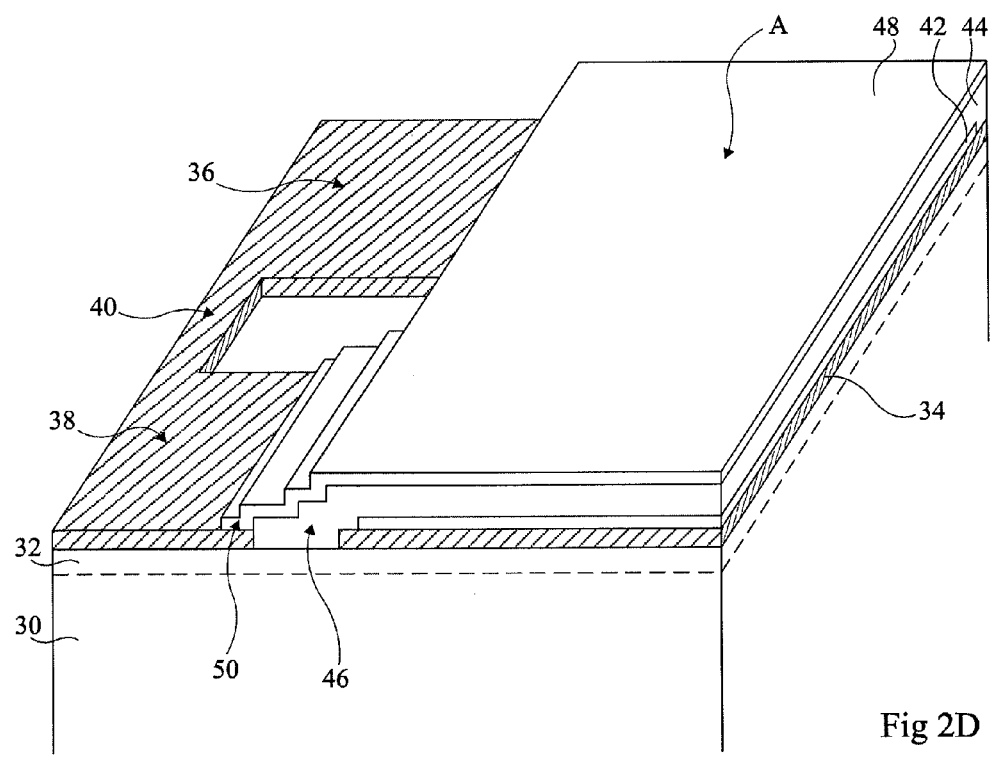

At the step illustrated in FIG. 2D, an anode layer 48 has been formed on electrolyte layer 44, at the level of active area A. As an example, layer 48 may be made of silicon or of amorphous germanium. Layer 48 comprises an extension 50 above extension 46 of electrolyte layer 44. Extension 50 is provided to contact anode pad 38. As an example, layer 48 may have a thickness ranging from 50 to 800 nm.

Then only, an insertion of lithium ions is performed to transform TiOS layer 42 into an LiTiOS layer. For this purpose, lithium is deposited on anode layer 48 by thermal metal evaporation. The silicon or germanium of layer 48 then becomes conductive under the influence of lithium and the battery starts operating in short-circuit, via extension 50 and strip 40. During their evaporation, lithium ions transit from anode layer 48 to cathode layer 42 and the battery reaches a fully discharged state in which the lithium ions are as a majority located in the cathode layer.

This lithium insertion method in layer 42 corresponds to a normal operation of the battery when it is connected to a load. The short-circuit formed by extension 40 is maintained during the entire evaporation of lithium and the penetration of the Li+ ions into layer 42. The evaporation time may be provided to be approximately one hour.

Figure 2E:
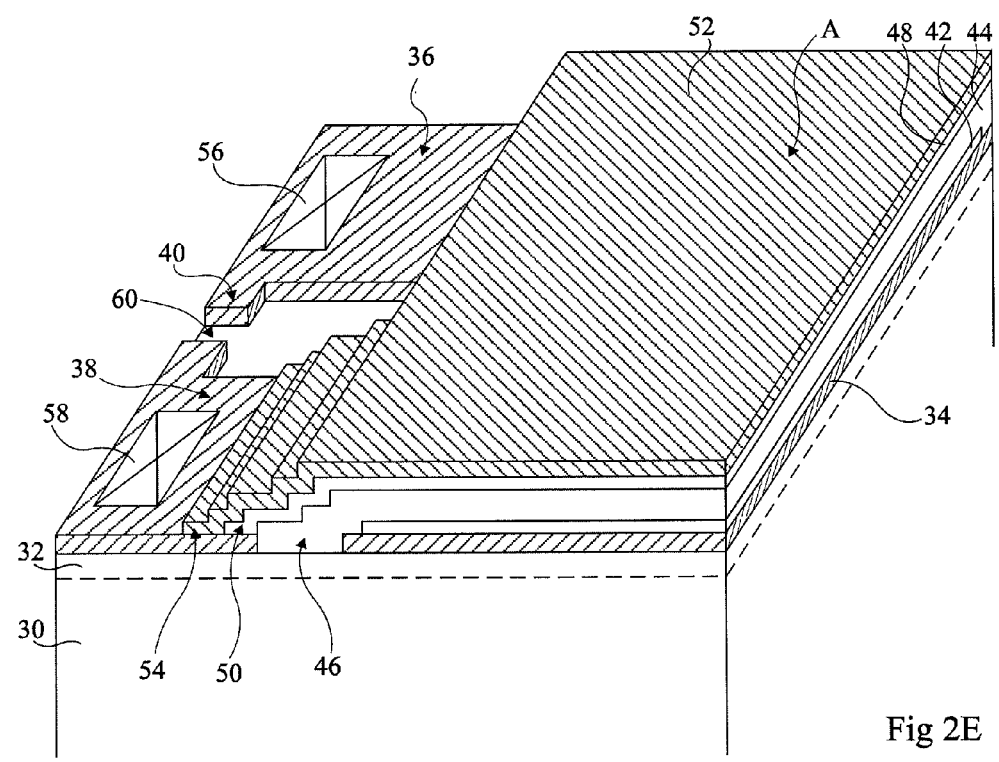

At the step illustrated in FIG. 2E, an anode collector layer 52 has been formed on the structure. The layer extends, in active layer A, over the stack of layers 34, 42, 44, and 48. Layer 52 comprises an extension 54 which extends over extension 50 to contact anode pad 38. Layer 52 may, for example, be made of titanium.

Connection areas, not shown in detail, respectively 56 and 58, are then formed on pads 36, respectively 38. A passivation and encapsulation layer may then be formed over the entire device. It should be noted that connection areas 56 and 58 may also be formed after any other step of the method described herein.

According to an embodiment, before or after the encapsulation step, a cut is performed in extension 40 between pads 36 and 38. Cut 60 may be performed by means of a laser or by a lithographic etching step. Thus, the anode and cathode electrodes are separated, the battery being no longer in short-circuit are is ready to be charged. It should be noted that the material forming strip 40 may be made of a conductive material different from that of cathode collector layer 34 to ease this cutting step.

The method disclosed herein has the advantage of providing a step of insertion of lithium ions into the cathode layer once said layer has been covered with the electrolyte layer and the anode layer. Thus, a battery having a better charge capacity and enabling a greater number of operating cycles than prior batteries is obtained. Further, this battery withstands thermal processings (for example, during a subsequent welding step) better than known batteries.

The manufacturing of batteries is generally followed by a test. To perform this test, the batteries are discharged. The method disclosed herein has the advantage of forming batteries having a discharged state at the end of their manufacturing. It is thus not necessary to provide a battery discharge step before performing a test.

Specific embodiments of the present invention have been described. Various alterations and modifications will occur to those skilled in the art. In particular, it should be noted that the method disclosed herein comprises several key steps: forming the stack of the cathode, electrolyte, and anode layers, the cathode layer being intended to receive lithium; short-circuiting the anode and cathode layers; having the lithium ions penetrate into the cathode layer, through the anode and electrolyte layers, by metal evaporation of lithium; and opening the short-circuit between the anode and cathode layers.

Thus, the steps of forming of a short-circuit between the anode and cathode layers and of opening of this short-circuit once lithium has been inserted may be carried out differently from what has been discussed herein.

The method disclosed herein provides batteries delivering voltages smaller than 3 V. Such batteries are, among others, particularly well adapted to power data retention circuits (real time clock, non-volatile RAMs . . . ).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for forming an integrated lithium-ion type battery, comprising:

forming, on a substrate, a stack comprising a cathode layer made of a material capable of receiving lithium ions, an electrolyte layer, and an anode layer of the battery;

forming a short-circuit between the anode and cathode layers during formation of the battery;

inserting lithium ions into the cathode layer; and opening the short-circuit between the anode and cathode layers.

2. The method of claim 1, comprising a previous step of forming a cathode collector layer on the substrate, under said stack, the cathode collector layer comprising an extension forming a first pad intended to receive a cathode connection and a second separate pad intended to receive an anode connection, the short-circuit between the anode and cathode layer being formed by a conductive strip extending between the first and second pads, the anode layer extending all the way to the second pad.

3. The method of claim 2, wherein the step of opening of the short-circuit is performed by cutting the strip by means of a laser or by performing a photolithography.

4. The method of claim 1, further comprising, after inserting lithium ions into the cathode layer, forming an anode collector layer and forming a passivation layer on the structure.

5. The method of claim 1, wherein the cathode layer is made of titanium oxysulfide and the anode layer is made of silicon or germanium.

6. The method of claim 1, wherein the electrolyte layer is made of lithium phosphorus oxynitride.

7. The method of claim 2, wherein the cathode collector layer, the conductive strip, and the pads are made of a same material.

8. The method of claim 1, wherein the substrate is covered with an insulating layer.

9. The method of claim 1 wherein inserting lithium into the cathode layers comprises penetrating lithium ions into the cathode layer through the anode and electrolyte layers by metal evaporation of lithium.

10. The method of claim 1 wherein inserting lithium into the cathode layers comprises performing a thermal evaporation of lithium.

* * * * *